United States Patent
Kell et al.

(10) Patent No.: US 9,329,377 B2
(45) Date of Patent: May 3, 2016

(54) BOROSCOPE AND A METHOD OF PROCESSING A COMPONENT WITHIN AN ASSEMBLED APPARATUS USING A BOROSCOPE

(71) Applicant: ROLLS-ROYCE PLC, London (GB)

(72) Inventors: James Kell, Nottingham (GB); Thomas Danvers, Wirksworth (GB); Peter Russhard, Nottingham (GB); Clive Mark Beech, Derby (GB); Graeme Rigg, Derby (GB); Ian McGill, Rhu (GB)

(73) Assignee: ROLLS-ROYCE plc, London (GB)

( * ) Notice: Subject to any disclaimer, the term of this patent is extended or adjusted under 35 U.S.C. 154(b) by 350 days.

(21) Appl. No.: 13/967,768

(22) Filed: Aug. 15, 2013

(65) Prior Publication Data

US 2014/0069460 A1  Mar. 13, 2014

(30) Foreign Application Priority Data

Sep. 7, 2012 (GB) .................................. 1215989.3

(51) Int. Cl.
| | | |
|---|---|---|
| B08B 7/00 | (2006.01) | |
| G02B 23/24 | (2006.01) | |
| F01D 5/00 | (2006.01) | |
| B24B 49/12 | (2006.01) | |

(Continued)

(52) U.S. Cl.
CPC ............ *G02B 23/2469* (2013.01); *B08B 1/002* (2013.01); *B23Q 17/24* (2013.01); *B24B 49/12* (2013.01); *B25F 3/00* (2013.01); *F01D 5/005* (2013.01); *G02B 23/2423* (2013.01); *A46B 13/02* (2013.01); *A46B 2200/30* (2013.01); *A46B 2200/40* (2013.01); *B08B 1/00* (2013.01); *B08B 1/04* (2013.01); *B08B 9/00* (2013.01); *B08B 9/02* (2013.01); *B08B 9/027* (2013.01); *Y10T 29/49234* (2015.01); *Y10T 29/49769* (2015.01)

(58) Field of Classification Search
CPC .... G02B 23/2469; F01D 5/005; B24B 49/12; B08B 1/002; B08B 1/00; B08B 9/00; B08B 9/02; B08B 9/027; B08B 1/04; B46B 2200/40; G01M 15/14; A46B 13/02; A46B 2200/30; A46B 2200/40
See application file for complete search history.

(56) References Cited

U.S. PATENT DOCUMENTS

| | | | |
|---|---|---|---|
| 5,102,221 | A | 4/1992 | Desgranges et al. |
| 5,349,940 | A | 9/1994 | Takahashi et al. |

(Continued)

FOREIGN PATENT DOCUMENTS

| | | |
|---|---|---|
| JP | A-10-272097 | 10/1998 |
| JP | A-2008-220709 | 9/2008 |
| WO | WO 2009/129788 A2 | 10/2009 |

OTHER PUBLICATIONS

Nov. 21, 2013 Search Report issued in European Patent Application No. 13 18 0529.

(Continued)

*Primary Examiner* — Bibi Carrillo
(74) *Attorney, Agent, or Firm* — Oliff PLC

(57) ABSTRACT

A boroscope has a first end and a second end, and the first end of the boroscope has an optical fiber and light source. A working head is attached to the first end of the boroscope. The working head has an electrical motor, and a tool is attached to and is arranged to be driven by the electrical motor. The boroscope carries a cable extending from the electrical motor to the second end of the boroscope.

17 Claims, 4 Drawing Sheets

(51) Int. Cl.
  B08B 1/00 (2006.01)
  B25F 3/00 (2006.01)
  B23Q 17/24 (2006.01)
  *B08B 1/04* (2006.01)
  *B08B 9/00* (2006.01)
  *B08B 9/02* (2006.01)
  *B08B 9/027* (2006.01)
  *A46B 13/02* (2006.01)

(56) References Cited

U.S. PATENT DOCUMENTS

| | | | | |
|---|---|---|---|---|
| 5,449,919 A | * | 9/1995 | Smart | G02B 23/2476 250/458.1 |
| 5,475,485 A | | 12/1995 | Diener | |
| 5,644,394 A | | 7/1997 | Owens | |
| 5,697,834 A | * | 12/1997 | Heumann | B24B 49/12 451/347 |
| 6,929,604 B2 | * | 8/2005 | Stone | A61B 1/00096 356/600 |
| 2005/0035096 A1 | * | 2/2005 | Kilburn | B08B 7/0042 219/121.68 |
| 2006/0252995 A1 | | 11/2006 | Hoeg et al. | |
| 2007/0089545 A1 | * | 4/2007 | Roney | F01D 21/003 73/865.8 |
| 2010/0179775 A1 | * | 7/2010 | Loftus | G01H 1/003 702/56 |
| 2012/0286109 A1 | * | 11/2012 | Clark | F01D 21/003 248/70 |
| 2013/0081654 A1 | * | 4/2013 | Harvell | F01D 25/002 134/8 |
| 2014/0130583 A1 | * | 5/2014 | Kell | G01M 15/14 73/112.05 |

OTHER PUBLICATIONS

Search Report issued in British Patent Application No. 1215989.3 dated Dec. 21, 2012.

* cited by examiner

BOROSCOPE AND A METHOD OF PROCESSING A COMPONENT WITHIN AN ASSEMBLED APPARATUS USING A BOROSCOPE

BACKGROUND

The present invention relates to a boroscope and a method of processing a component within an assembled apparatus in particular relates to a flexible boroscope a method of processing a component within an assembled apparatus using a flexible boroscope.

Currently boroscopes are used to view internal components within an assembled gas turbine engine, or other engine, machine, apparatus etc, to determine if the components within the gas turbine engine are damaged and need repair or if they are undamaged and do not require repair. The use of boroscopes enables the components within the gas turbine engine, or other engine, machine, apparatus etc, to be viewed without having to disassemble the gas turbine engine into modules or sub modules.

SUMMARY

There are two types of boroscopes, there are rigid boroscopes and flexible boroscopes. Rigid boroscopes are inserted into an assembled apparatus through an aperture in a casing to enable components within line of sight to be viewed. Flexible boroscopes are also inserted into an assembled apparatus through an aperture in the casing and the boroscope may be continuously inserted and maneuvered so that components deeper within the apparatus, and not within line of sight, of the aperture may be viewed.

The flexible boroscopes are maneuvered, or controlled, using cables within the boroscope which are pulled by motors in the control unit of the flexible boroscope.

Gas turbine engines are provided with one or more tip timing probes. A tip timing probe is located in a recess in the radially inner surface of a casing surrounding a stage of compressor blades or a stage of turbine blades. A tip timing probe is arranged to provide an electrical signal when a rotating blade passes. The electrical signals are analysed to determine the level of vibration of the rotating blades.

A problem associated with the tip timing probes is that the recess within which a tip timing probe is located quickly becomes dirty, that is material collects in the recess radially between the tips of the blades and the tip timing probe. Thus, the useful working life of the tip timing probe is limited.

It has been proposed in JP10272097A to provide a flexible drive shaft extending through a flexible boroscope to a brush. The brush may be used to clean the inside of a conduit.

It has been proposed in U.S. Pat. No. 5,644,394 to provide a flexible drive which extends through the full length of a rigid tube to a tool and a rigid boroscope. The flexible drive may be used to drive the tool to process components within the gas turbine engine, other engine, machine, apparatus etc, e.g. to machine a damaged component. An external motor is used to drive the drive shaft.

Similar arrangements are proposed in U.S. Pat. No. 5,102,221 and U.S. Pat. No. 5,475,485.

A problem with these arrangements is that the external motor and flexible drive shaft may produce heating of and damage to the boroscope optical fibre. A further problem is that the flexible drive shafts may not have a sufficiently small diameter to be able to pass through an aperture in the casing of the apparatus. An additional problem is that the flexible shaft has to be made more robust so as not to wear out and this generally adds weight and increases the diameter of the boroscope and increasing the minimum diameter of the aperture through which the boroscope may be used.

Accordingly the present invention seeks to provide a novel boroscope which reduces, preferably overcomes, the above mention problem(s).

Accordingly the present invention provides a boroscope having a first end and a second end, the first end of the boroscope having an optical fibre and a light source, a working head being attached to the first end of the boroscope, the working head having an electrical motor, a tool being attached to and being arranged to be driven by the electrical motor and the boroscope carrying a cable extending from the electrical motor to the second end of the boroscope.

The tool may comprise a brush or a machining tool. The machining tool may comprise a grinding wheel.

The cable may extend through the boroscope from the first end to the second end of the boroscope.

An electrical power source may be connected to the cable at the second end of the boroscope.

The working head may comprise a first portion and a second portion, the first end of the working head comprising a collar arranged to locate on the first end of the boroscope and the electrical motor being secured to the second portion of the working head.

The boroscope may have a bendable section adjacent to the first end of the boroscope.

The present invention also provides a method of processing a component within an assembled apparatus, the apparatus comprising a casing enclosing the component, the casing having at least one aperture extending there-through, the method comprising:

a) inserting a boroscope through the aperture, the boroscope having a first end and a second end, the first end of the boroscope having an optical fibre and a light source, a working head being attached to the first end of the boroscope, the working head having an electrical motor, a tool being attached to and being arranged to be driven by the electrical motor and the boroscope carrying a cable extending from the electrical motor to the second end of the boroscope, b) viewing the assembled apparatus within the casing using the optical fibre, c) viewing the assembled apparatus within the casing using the optical fibre while moving the working head of the boroscope to the component, d) supplying an electrical current through the cable to the electric motor, e) driving the tool using the electrical motor, f) processing the component using the tool, and f) viewing the component and the tool with the optical fibre to monitor the processing of the component.

The tool may comprise a brush and step f) comprises cleaning the surface of the component.

The tool may comprise a machining tool and step f) comprises machining the surface of the component. The tool may comprise a grinding wheel.

The assembled apparatus may comprise a gas turbine engine. The component may comprise a compressor blade, a compressor vane, a turbine blade or a turbine vane.

The component may comprise a tip timing probe, the tip timing probe being mounted in a recess in a casing located around a stage of turbine blades or compressor blades.

The boroscope may have a bendable section between the first end of the boroscope and an adjacent portion of the boroscope.

The method may comprise bending the bendable section of the boroscope to provide a bend between the first end of the boroscope and the adjacent portion of the boroscope and resting the adjacent portion against another component within the assembled apparatus.

BRIEF DESCRIPTION OF THE DRAWINGS

The present invention will be more fully described by way of example with reference to the accompanying drawings, in which.

DETAILED DESCRIPTION

Figure 1:
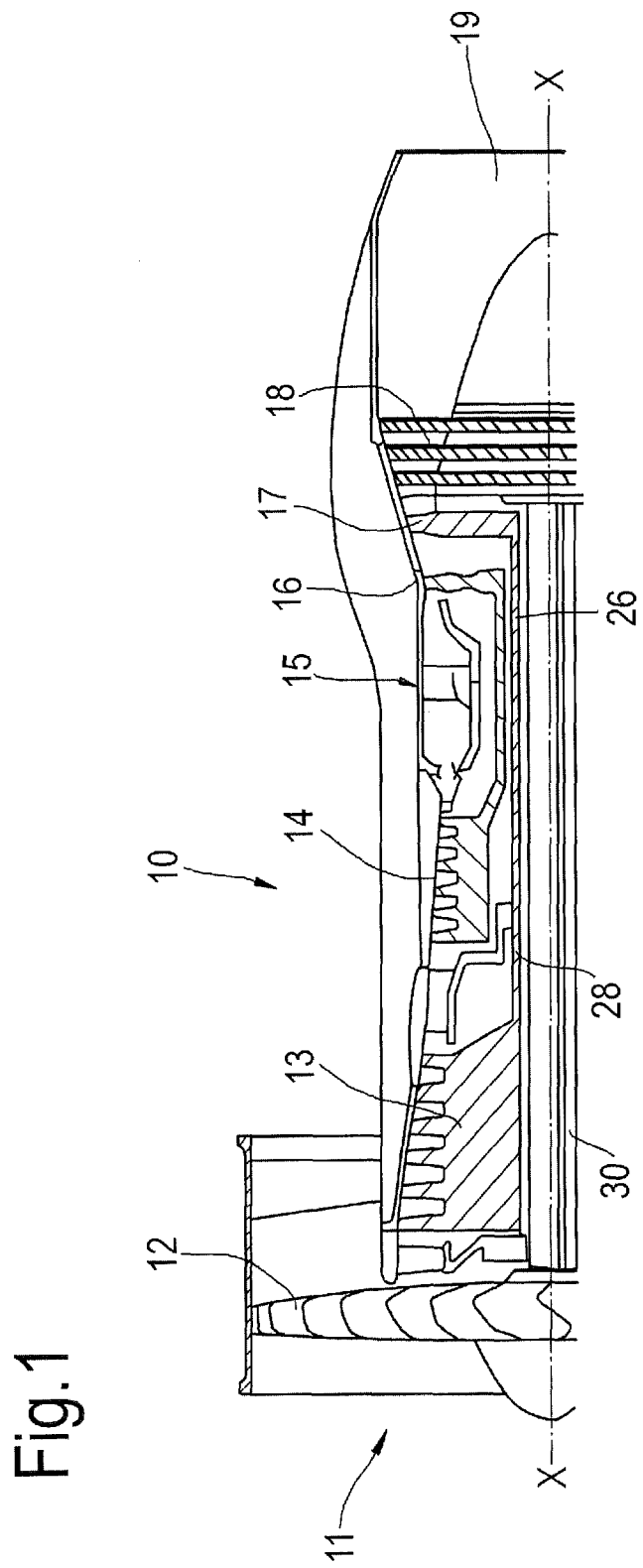
FIG. 1 is cut-away view of a turbofan gas turbine engine.

A turbofan gas turbine engine 10, as shown in FIG. 1, comprises in flow series an intake 11, a fan 12, an intermediate pressure compressor 13, a high pressure compressor 14, a combustor 15, a high pressure turbine 16, an intermediate pressure turbine 17, a low pressure turbine 18 and an exhaust 19. The high pressure turbine 16 is arranged to drive the high pressure compressor 14 via a first shaft 26. The intermediate pressure turbine 17 is arranged to drive the intermediate pressure compressor 13 via a second shaft 28 and the low pressure turbine 18 is arranged to drive the fan 12 via a third shaft 30. In operation air flows into the intake 11 and is compressed by the fan 12. A first portion of the air flows through, and is compressed by, the intermediate pressure compressor 13 and the high pressure compressor 14 and is supplied to the combustor 15. Fuel is injected into the combustor 15 and is burnt in the air to produce hot exhaust gases which flow through, and drive, the high pressure turbine 16, the intermediate pressure turbine 17 and the low pressure turbine 18. The hot exhaust gases leaving the low pressure turbine 18 flow through the exhaust 19 to provide propulsive thrust. A second portion of the air bypasses the main engine to provide propulsive thrust.

Figure 2:
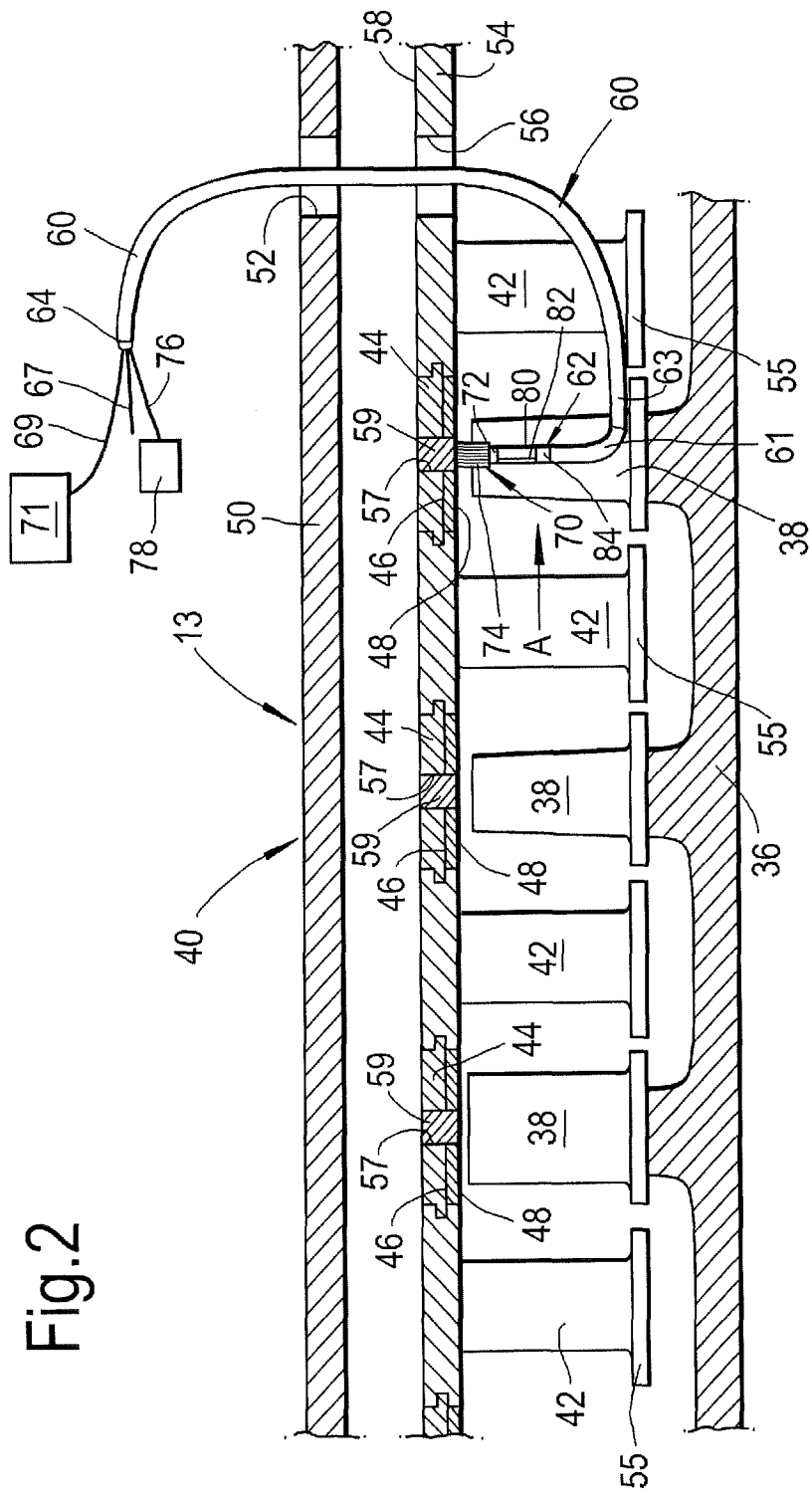
FIG. 2 is an enlarged cross-sectional view through a compressor of the turbofan gas turbine engine showing a boroscope being used in a method of processing a component according to the present invention.

The intermediate pressure compressor 13, as shown more clearly in FIG. 2, comprises a rotor 36 carrying a plurality of stages of compressor rotor blades 38 and a stator 40 carrying a plurality of stages of compressor stator vanes 42. The compressor rotor blades 38 in each stage are circumferentially spaced and extend generally radially outwardly from the rotor 36. The compressor stator vanes 42 in each stage are circumferentially spaced and extend generally radially inwardly from the stator 40. The stator 40 also comprises a plurality of shrouds 44 axially interconnecting the stages of compressor stator vanes 42 and the shrouds 44 are positioned radially around a corresponding one of the stages of compressor rotor blades 38. The stator 40 of the intermediate pressure compressor 28 also comprises an outer compressor casing 50 and the outer compressor casing 50 is provided with one or more apertures 52 to allow access for boroscopes and/or repair device. In addition the radially outer platforms 54 of one or more of the compressor stator vanes 42 have one or more apertures 56 to allow access for boroscopes and/or repair devices. The shrouds 44 axially interconnecting the stages of compressor stator vanes 42 form a portion of an inner compressor casing 58. The compressor stator vanes 42 also have radially inner platforms 55. The shrouds 44 positioned around one or more of the compressor rotor blades 38 are provided with tip timing probes 59 located in recesses 57 in the shrouds 44.

A boroscope 60, as shown more clearly in FIGS. 2 to 5, has a first end 62 and a second end 64 and the first end 62 of the boroscope 60 has an end 66 of an optical fibre 67 and a light source 68. The optical fibre 67 in this example extends through the boroscope 60 from the first end 62 of the boroscope 60 to the second end 64 of the boroscope 60. A first electrical cable 69 in this example extends through the boroscope 60 from the light source 68 at the first end 62 of the boroscope 60 to the second end 64 of the boroscope 60. A first electrical power source 71 is connected to the first electrical cable 69 at the second end 64 of the boroscope 60.

A working head 70 is attached to the first end 62 of the boroscope 60 and the working head 70 has an electrical motor 72 and a tool 74 is attached to and arranged to be driven by the electrical motor 72. The electrical motor 72 and the tool 74 are arranged coaxially and the shaft of the electrical motor 72 in particular is arranged to drive the tool 74. The boroscope 60 carries a second electrical cable 76 which extends from the electrical motor 72 to the second end 64 of the boroscope 60. The second electrical cable 76 in this example extends through the boroscope 60 from the first end 62 to the second end 64 of the boroscope 60. The tool 74 in this example is brush and in this particular example has a cylindrical body 75 which has a plurality of bristles 77 extending generally axially from the cylindrical body 75. A second electrical power source 78 is connected to the second electrical cable 76 at the second end 64 of the boroscope 60. The working head 70 comprises a first portion 80 and a second portion 82 and the first portion 80 of the working head 70 comprising a collar 84 which is arranged to locate on the first end 62 of the boroscope 60 and the electrical motor 72 is secured to the second portion 82 of the working head 70. In this example the electrical motor 72 is secured to the second portion 82 of the working head 70 by shrink wrap 86 which is wrapped around the electrical motor 72 and the second portion 82, but other suitable techniques may be used, e.g. bolts, screws, fasteners, glue etc.

The boroscope 60 is used to clean material from the recesses 57 in the shrouds 44 which has accumulated on top of the tip timing probes 59 located in the recesses 57.

The present invention provides a method of processing a component, in this example cleaning the surface of the tip timing probe 59 within the recess 57 within an assembled gas turbine engine 10. The gas turbine engine 10 comprises inner and outer casings 58 and 50 respectively, enclosing the tip timing probes 59. The inner and outer casings 58 and 50 have at least one aperture 52, 56 extending there-through.

Figure 5:
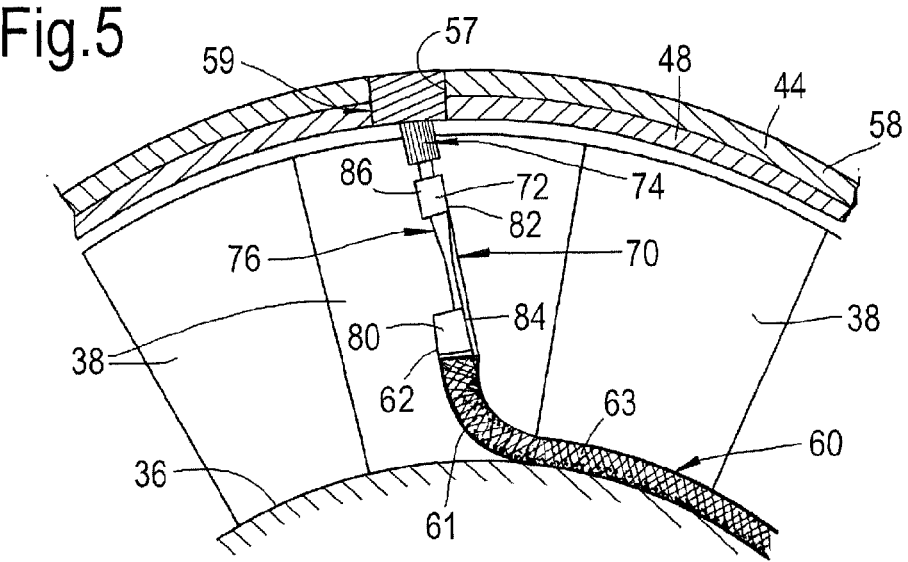
FIG. 5 is a further enlarged view in the direction of arrow A in FIG. 2 showing the working head of the boroscope being used in a method of processing a component according to the present invention.

The method comprises inserting the boroscope 60 through the apertures 52, 56, in the outer and inner casings 50 and 58 respectively in particular the first end 62 of the boroscope 60 is inserted. The interior of the intermediate pressure compressor 13 of the assembled gas turbine engine 10 within the casings 50 and 58 is viewed using the end 66 of the optical fibre 67 at the first end 62 of the boroscope 60. The interior of the intermediate pressure compressor 13 of the assembled gas turbine engine 10 within the casings 50 and 58 is viewed while moving the working head 70 of the boroscope 60 to the tip timing probes 59 using the end 66 of the optical fibre 67 at the first end 62 of the boroscope 60. Once the working head 70 of the boroscope 60 is in the correct position, as shown in FIG. 5, an electrical current is supplied from the second electrical power source 78 through the cable 76 to the electric motor 72 and the electrical motor 72 drives the tool, brush, 74, e.g. rotates the tool, brush, 74 about its axis of rotation. The tool, brush, 74 processes the tip timing probe 59 by removing, brushing away, the material from the recess 57. The tip timing probe 59 and the shroud 44 within which the tip timing probe 59 is located and the tool, brush, 74 are viewed using the end 66 of the optical fibre 67 at the first end 62 of the boroscope 60 to monitor the removal of the material from the tip timing probe 59 in the recess 57 in the shroud 44.

It is to be noted that the boroscope 60 is arranged such that it rests on the radially outer surface of the rotor 36 and that the boroscope 60 has a flexible, bendable, section 61 between the first end 62 of the boroscope 60 and an adjacent portion 63 of the boroscope 60 and that the bendable section 61 provides a bend of approximately 90° between the first end 62 of the boroscope 60 and the adjacent portion 63 of the boroscope 60. The reactive force of the tool 74 and the electric motor 72 is transmitted through the working head 70 to the first end 62 of the boroscope 60 and through the bendable section 61 to the adjacent portion 63 of the boroscope 60 and finally from the adjacent portion 63 of the boroscope 60 into the rotor 36. The radially outer surface of the rotor 36 may be a radially outer surface of a platform of a compressor rotor blade 38 or the actual radially outer surface of the rotor 36.

The boroscope 60 may be provided with working heads 70 which have different lengths, such that the different working heads 70 may be used to clean the tip timing probes 59 in the shrouds 44 positioned around the different stages of compressor rotor blades 38. The compressor rotor blades 38 at the upstream of the compressor have a greater radial length than the compressor rotor blades 38 at the downstream end of the compressor and therefore, and thus a working head 70 is selected such that its length is appropriate for the radial length of the particular stage of compressor rotor blades 38.

Although the present invention has been described with reference to using a brush to clean the material away from a tip timing probe in the compressor of a gas turbine engine it may be used to clean the material away from a tip timing probe in the turbine of a gas turbine engine. Similarly it may be used to clean the material away from a tip timing probe in the turbine of a steam turbine, or in the compressor or turbine of any other type of turbomachine. The bendable section of the boroscope provides a bend between the first end of the boroscope and the adjacent portion of the boroscope and the adjacent portion is rested against another component within the assembled apparatus.

Although the present invention has been described with reference to using a brush to clean the material away from a tip timing probe in the compressor of a gas turbine engine it may be used to clean the material away from cooling passages, or cooling apertures, in a turbine blade, a turbine vane, a combustion chamber wall, a combustion chamber tile or any other turbine component in the turbine of a gas turbine engine. It may be used to clean the material away from a fuel injector of a gas turbine engine. The bendable section of the boroscope provides a bend between the first end of the boroscope and the adjacent portion of the boroscope and the adjacent portion is rested against another component within the assembled apparatus.

The present invention may be used to clean the surface of any other component in an assembled apparatus, e.g. an oil rig, a steam turbine, a turbomachine, a ship engine, a nuclear reactor, an internal combustion engine, an aircraft, a ship, a locomotive etc. The bendable section of the boroscope provides a bend between the first end of the boroscope and the adjacent portion of the boroscope and the adjacent portion is rested against another component within the assembled apparatus.

Figure 6:
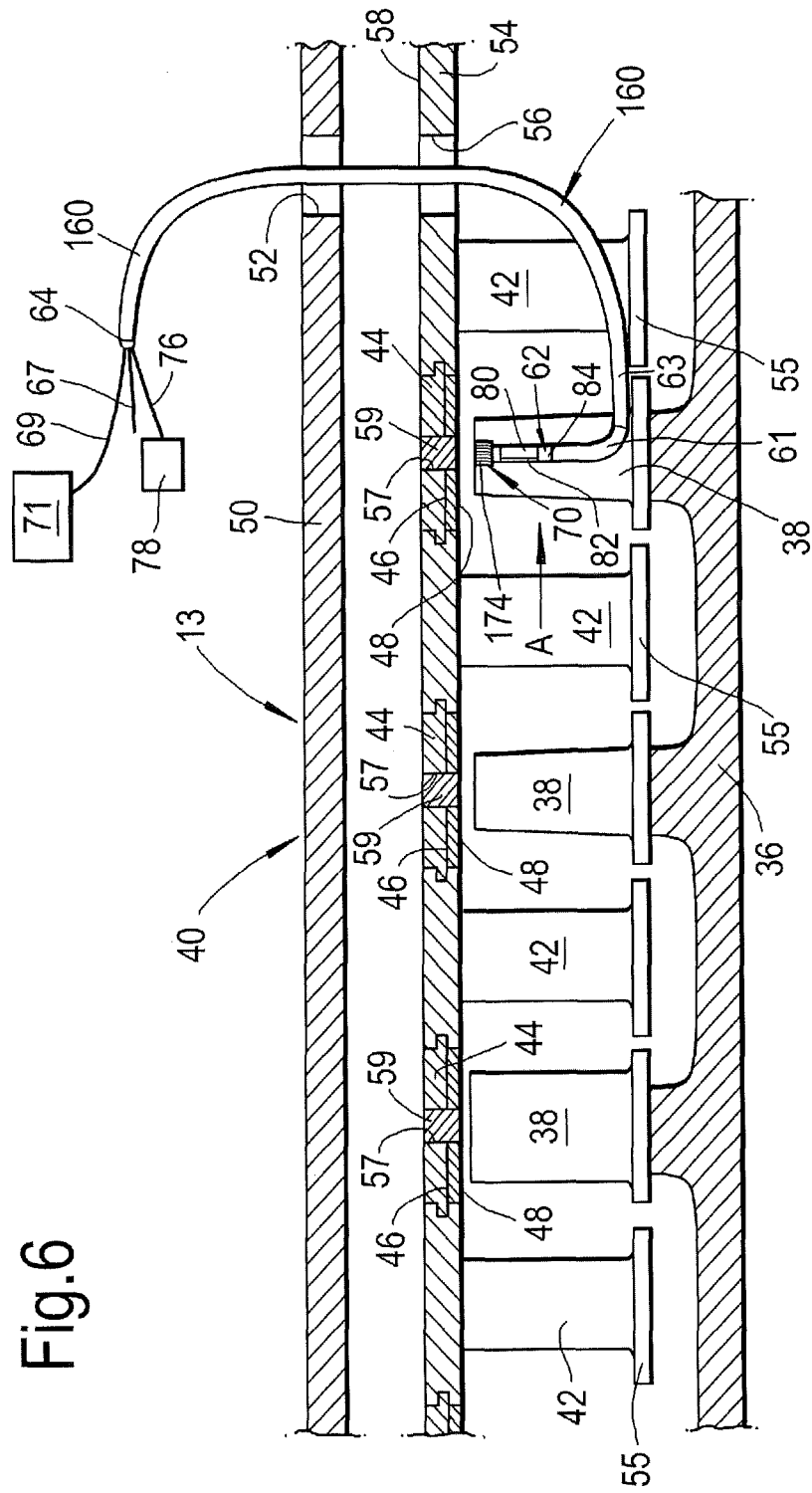
FIG. 6 is an enlarged cross-sectional view through a compressor of the turbofan gas turbine engine showing a boroscope being used in an alternative method of processing a component according to the present invention.

An alternative boroscope 160 is shown more clearly in FIG. 6. The boroscope 160 is similar to that shown in FIGS. 3 to 5 and like parts are denoted by like numerals. The boroscope 160 has a first end 62 and a second end 64 and the first end 62 of the boroscope 160 has an optical fibre 66 and light source 68. A working head 70 is attached to the first end 62 of the boroscope 160 and the working head 70 has an electrical motor 72 and a tool 174 is attached to and is arranged to be driven by the electrical motor 72. The electrical motor 72 and the tool 174 are arranged coaxially and the shaft of the electrical motor in particular is arranged to drive the tool 74. The boroscope 160 carries a cable 76 which extends from the electrical motor 72 to the second end 64 of the boroscope 160. The cable 76 in this example extends through the boroscope 160 from the first end 62 to the second end 64 of the boroscope 160. The tool 174 in this example is a machining tool and in particular is a grinding wheel and the axis of the grinding wheel is arranged coaxially with the shaft of the electric motor 72. The second electrical power source 78 is connected to the cable 76 at the second end 64 of the boroscope 160. The working head 70 comprises a first portion 80 and a second portion 82 and the first portion 80 of the working head 70 comprising a collar 84 which is arranged to locate on the first end 62 of the boroscope 160 and the electrical motor 72 is secured to the second portion 82 of the working head 70. The bendable section 61 of the boroscope 160 provides a bend between the first end 60 of the boroscope 160 and the adjacent portion 63 of the boroscope 160 and the adjacent portion 63 is rested against another component within the assembled apparatus.

In this example once the boroscope 160 is located in the correct position relative to a component within the assembled gas turbine engine 10 an electrical current is supplied through the cable 76 to the electrical motor 72 to drive the grinding wheel 174. The grinding wheel 174 may be used to grind the surfaces of compressor blades, compressor vanes, turbine blades or turbine vanes. The grinding wheel may be used, to grind compressor discs, compressor drums, turbine discs of a gas turbine engine, in particular the balancing lands of these components or to grind shafts of a gas turbine engine.

Other tools may be provided on the working head and driven by the electric motor, for example drills, cutters, polishers etc.

The present invention may be used to machine the surface of any other component in an assembled apparatus, e.g. an oil rig, a steam turbine, a turbomachine, a ship engine, a nuclear reactor, an internal combustion engine, an aircraft, a ship, a locomotive etc.

A chuck, or collet, may be provided on the shaft of the electric motor to enable different tools to be provided on the working head.

Figure 3:
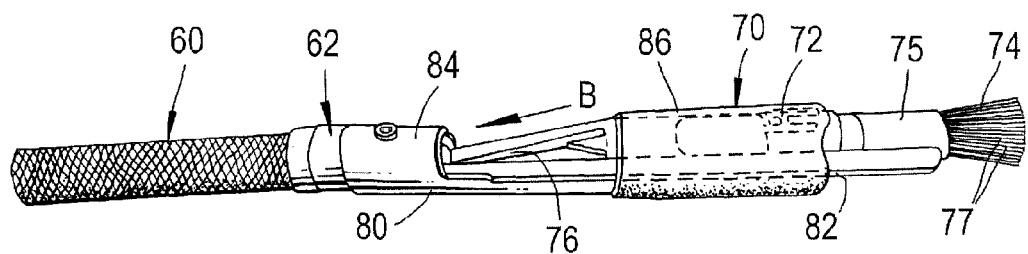
FIG. 3 is a further enlarged perspective view of the working head of the boroscope shown in FIG. 2.
Figure 4:
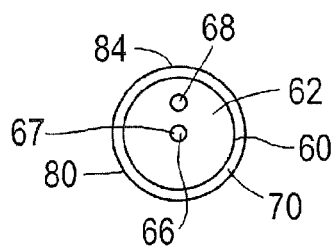
FIG. 4 is a view in the direction of arrow B in FIG. 3 showing the first end of the boroscope.

As discussed previously the boroscope may be provided with working heads which have different lengths and thus it is clear that each working head is removably attached to the boroscope so that working heads with different lengths may be used. As discussed previously the collar of the first portion of the working head is arranged to locate on the first end of the boroscope and the collar is removably located on the first end of the boroscope. The collar is cylindrical and the inner surface of the collar has substantially the same diameter as the outer surface of the first end of the boroscope as seen in FIG. 4. The second portion of the working head extends way from the first end of the boroscope and away from the remainder of the boroscope, as seen in FIGS. 3 and 5. The electric motor and the tool are spaced from the first end of the boroscope as seen in FIGS. 3 and 5 and this enables the tool, brush or machining tool, and the component, compressor blade, compressor vane, turbine blade, turbine vane, tip timing probe in a recess in a casing located around a stage of compressor blades or a stage of turbine blades etc. to be viewed using the end of the optical fibre at the first end of the boroscope. The working head may be removed from the first end of the boroscope when the work has been completed.

The axes of the electrical motor and the tool, e.g. the rotational axes of the electrical motor and the tool, are arranged coaxially as discussed previously. The rotational axes of the electrical motor and the tool are also arranged coaxially with the axes of the first end of the boroscope and the collar of the working head as shown in FIGS. 2, 3, 5 and 6. The rotational axes of the electrical motor and the tool may be arranged non-coaxially with the axes of the first end of the boroscope and the collar of the working head and the working head may have an elbow to provide a better view of the tool, the electric motor and the component from the end of the optical fibre at the first end of the boroscope.

The outer diameter of the electric motor is the same as or smaller than the outer diameter of the collar of the working head as shown in FIGS. 2, 3, 5 and 6 to enable the electric motor to pass through the aperture(s) in the casing of the assembled apparatus.

An advantage of the present invention is that there is no need to have a flexible drive shaft extending through the boroscope to drive a tool at the end of the boroscope. Another advantage is that the deletion of the flexible drive shaft reduces heating of and damage to the boroscope optical fibre. A further advantage is that the deletion of the flexible drive shaft enables the diameter and weight of the boroscope to be reduced and hence enables the boroscope to pass through smaller diameter apertures in the casing of an apparatus.

The invention claimed is:

1. A boroscope comprising:
   a tube of the boroscope including:
      a first end of the tube of the boroscope including an end of an optical fiber and a light source, and
      a second end of the tube of the boroscope opposite of the first end of the tube of the boroscope;
   a working head removably attached to the first end of the tube of the boroscope, the working head including:
      a first portion configured to be attached to the first end of the tube of the boroscope,
      a second portion opposite of the first portion, and
      an electrical motor secured to the second portion of the working head;
   a tool attached to the electrical motor, the tool being configured to be driven by the electrical motor; and
   an electrical cable extending from the electrical motor to the second end of the tube of the boroscope.

2. The boroscope as claimed in claim 1, wherein the tool includes a brush or a machining tool.

3. The boroscope as claimed in claim 1, wherein the electrical cable extends through the boroscope from the first end of the tube of the boroscope to the second end of the tube of the boroscope.

4. The boroscope as claimed in claim 1, wherein an electrical power source is connected to the electrical cable at the second end of the tube of the boroscope.

5. The boroscope as claimed in claim 1, wherein the working head includes a collar located on the first end of the tube of the boroscope.

6. The boroscope as claimed in claim 1, wherein the electrical motor has an axis and the tool has an axis, the axis of the electric motor and the axis of the tool being arranged coaxially.

7. The boroscope as claimed in claim 1, further comprising a bendable section between the first end of the tube of the boroscope and an adjacent portion of the boroscope.

8. The boroscope as claimed in claim 2, wherein the machining tool includes a grinding wheel.

9. The boroscope as claimed in claim 5, wherein the collar is cylindrical.

10. A method of processing a component within an assembled apparatus, the apparatus including a casing enclosing the component, the casing having at least one aperture extending through the casing, the method comprising:
    a) providing a boroscope including:
       a tube of the boroscope including:
          a first end of the tube of the boroscope including an end of an optical fiber and a light source, and
          a second end of the tube of the boroscope opposite of the first end of the tube of the boroscope;
       a working head removably attached to the first end of the tube of the boroscope, the working head including:
          a first portion configured to be attached to the first end of the tube of the boroscope,
          a second portion opposite of the first portion, and
          an electrical motor secured to the second portion of the working head;
       a tool attached to the electrical motor, the tool being configured to be driven by the electrical motor; and
       an electrical cable extending from the electrical motor to the second end of the tube of the boroscope, and
    inserting the first end of the tube of the boroscope through the aperture,
    b) viewing the assembled apparatus within the casing using the optical fiber,
    c) viewing the assembled apparatus within the casing using the optical fiber while moving the working head of the boroscope to the component,
    d) supplying an electrical current through the electrical cable to the electrical motor,
    e) driving the tool using the electrical motor,
    f) processing the component using the tool, and
    g) viewing the component and the tool with the optical fiber to monitor the processing of the component.

11. The method as claimed in claim 10, wherein
    the tool includes a brush, and
    step f) includes cleaning a surface of the component.

12. The method as claimed in claim 10, wherein
    the tool includes a machining tool, and
    step f) includes machining a surface of the component.

13. The method as claimed in claim 10, wherein the assembled includes a gas turbine engine.

14. The method as claimed in claim 10, wherein the tool includes a grinding wheel.

15. The method as claimed in claim 13, wherein the component is selected from a group consisting of: a compressor blade, a compressor vane, a turbine blade and a turbine vane.

16. The method as claimed in claim 13, wherein the component includes a tip timing probe, the tip timing probe being mounted in a recess in the casing located around a stage of blades, the stage of blades being selected from a group consisting of: a stage of turbine blades and a stage of compressor blades.

17. A boroscope comprising:
a tube of the boroscope including:
  a first end of the tube of the boroscope including an end of an optical fiber and a light source, and
  a second end of the tube of the boroscope opposite of the first end of the tube of the boroscope, the optical fiber extending from the first end of the tube of the boroscope to the second end of the tube of the boroscope;
a working head removably attached to the first end of the tube of the boroscope, the working head including:
  a first portion configured to be attached to the first end of the tube of the boroscope,
  a second portion opposite of the first portion, and
  an electrical motor secured to the second portion of the working head, the electrical motor having a shaft,
a tool attached to the electrical motor, the tool being configured to be driven by the shaft of the electrical motor;
a first electrical cable extending from the light source at the first end of the tube of the boroscope to the second end of the tube of the boroscope; and
a second electrical cable extending from the electrical motor on the working head at the first end of the tube of the boroscope to the second end of the tube of the boroscope.

* * * * *